(12) United States Patent
Hosono et al.

(10) Patent No.: US 6,447,019 B1
(45) Date of Patent: Sep. 10, 2002

(54) TUBE JOINT

(75) Inventors: Masayuki Hosono, Toride; Hiroshi Nakatsuka, Nagareyama, both of (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/499,394

(22) Filed: Feb. 7, 2000

(30) Foreign Application Priority Data

Feb. 18, 1999 (JP) ............................................. 11-040230

(51) Int. Cl.⁷ ................................................ F16L 55/00
(52) U.S. Cl. .................... 285/148.19; 285/39; 285/322; 285/323
(58) Field of Search .......................... 285/39, 322, 323, 285/340, 148.19, 921, 179; F16L 35/00, 55/00

(56) References Cited

U.S. PATENT DOCUMENTS

| 3,653,689 A | | 4/1972 | Sapy et al. | |
|---|---|---|---|---|
| 4,637,636 A | * | 1/1987 | Guest | .......................... 285/179 |
| 4,796,924 A | * | 1/1989 | Kosugi et al. | ................. 285/39 |
| 4,860,638 A | * | 8/1989 | Hosono et al. | ................. 91/536 |
| 4,890,865 A | * | 1/1990 | Hosono et al. | ............... 285/39 |

FOREIGN PATENT DOCUMENTS

| DE | 39 41 236 | | 6/1990 | |
|---|---|---|---|---|
| GB | 2 226 861 | | 7/1990 | |
| JP | 51-14166 | | 5/1976 | |
| JP | 63-177385 | | 11/1988 | |
| JP | 05-248581 | * | 9/1993 | ................. 285/340 |
| JP | 6-81988 | | 3/1994 | |
| JP | 7-83362 | | 3/1995 | |
| TW | 176209 | | 1/1992 | |

* cited by examiner

Primary Examiner—Lynne H. Browne
Assistant Examiner—Aaron M. Dunwoody
(74) Attorney, Agent, or Firm—Oblon, Spivak, McClelland, Maier & Neustadt, P.C.

(57) ABSTRACT

A tube joint including a joint body having a tube connection mechanism at one end and a coupling member coupled integrally with the other end of the joint body, where the tube connection mechanism is provided with a packing surrounding an outer surface of a tube to be inserted to function as a seal, and a stopper member for fixing the packing to prevent sliding movement.

19 Claims, 5 Drawing Sheets

TUBE JOINT

BACKGROUND OF THE INVENTION

1. Field of the Invention

The present invention relates to a tube joint capable of introducing and discharging, for example, a pressure fluid via a passage in communication therewith, by coupling and connecting the tube joint, for example, to a fluid pressure-operated apparatus such as a cylinder.

2. Description of the Related Art

The fluid pressure-operated apparatus such as a cylinder has been hitherto in widespread use in order to drive and control an object by utilizing, for example, compressed air. In general, the fluid pressure-operated apparatus is usually provided with a pressure fluid inlet/outlet port for introducing and discharging the pressure fluid. Therefore, a tube joint, which is used to connect each tube passage, is connected to the pressure fluid inlet/outlet port. For example, when a tube, which communicates with a pressure fluid supply source, is connected to the tube joint, the pressure fluid can be supplied from the pressure fluid supply source to the fluid pressure-operated apparatus.

Such a tube joint concerning the conventional technique is shown in FIG. 5 (see, for example, Japanese Patent Publication No. 51-14166).

The tube joint is provided with a socket 2 which has first, second, third, and fourth holes 1a to 1d formed to have a concentric configuration, and a collar 4 which is held in the first hole 1a of the socket 2 and which is formed with an inclined surface 3. A tightening member 6, which has four flexible jaws 5, is internally fitted to the collar 4. Each of the jaws 5 is formed with a knife edge 8 to bite into the outer circumferential surface of a tube 7 in cooperation with the inclined surface 3 of the collar 4 so that the tube 7 is prevented from disengagement. The tightening member 6 is provided displaceably along the axial direction of the collar 4.

A packing ring 9, which is formed of, for example, a rubber material, is installed to the second hole 1b which is disposed adjacent to the jaws 5. The packing ring 9 surrounds the outer circumferential surface of the tube 7 so that it functions as a seal.

When the tube 7 is coupled to the socket 2, it is enough that the tube 7 is simply inserted into the tightening member 6. Accordingly, the jaws 5 are expanded radially outwardly by the thrust force which is exerted when the tube 7 is forcibly inserted. Further, the tube 7 passes through the packing ring 9, and it arrives at the third hole 1c. Subsequently, when the tube 7 is pulled in a direction opposite to the insertion direction, or when the pressure is applied to the tube 7, then the knife edge 8 of the tightening member 6 bites into the surface of the tube 7. Thus, the tube 7 is fastened.

When the tube 7 is disengaged from the socket 2, the force in the direction of the arrow F is applied to the lower end of the tightening member 6 to apply the thrust force to the tube 7. Thus, the tube 7 can be pulled out in the direction opposite to the insertion direction.

However, the tube joint concerning the conventional technique described above involves the following inconvenience. That is, when the tube 7 is inserted, then the jaw 5 of the tightening member 6 abuts against the packing ring 9, and the packing ring 9 is pressed thereby. As a result, the packing ring 9 is expanded radially inwardly, and it is difficult to insert the tube 7.

The inconvenience described above is caused probably because of the following reason. That is, when the tube 7 is inserted, the tightening member 6 is displaced along the axial direction of the collar 4 to press the packing ring 9. As a result, the packing ring 9 is expanded radially inwardly. Therefore, the tube 7 to be inserted is tightened inwardly by the expanded packing ring 9.

Further, the tube joint concerning the conventional technique involves the following inconvenience. That is, the packing ring 9 is not fixed, and it is provided slidably along the second hole 1b. For this reason, any dust is generated due to the sliding movement of the packing ring 9. As a result, it is difficult to use the tube joint concerning the conventional technique in an environment in which cleanness is required, for example, in a clean room.

SUMMARY OF THE INVENTION

A general object of the present invention is to provide a tube joint which avoids any expansion of a seal member upon insertion to make it possible to easily insert a tube.

A principal object of the present invention is to provide a tube joint which avoids any dust formation otherwise caused by a seal member to make it possible to preferably use the tube joint in an environment in which cleanness is required.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
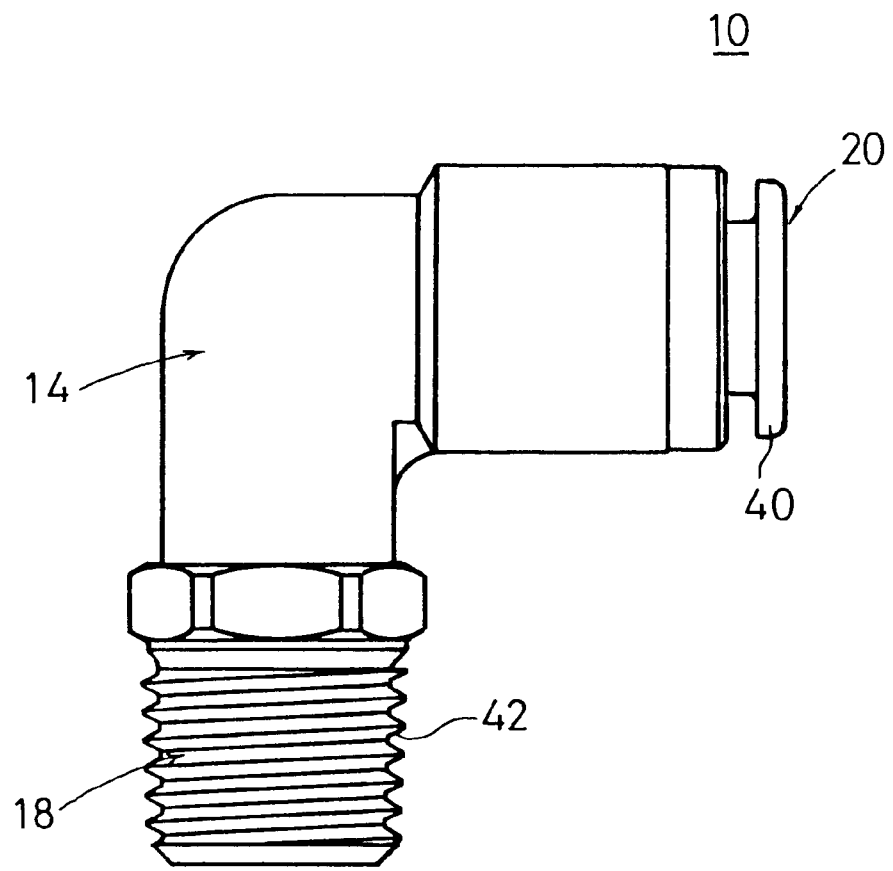
FIG. 1 shows a front view illustrating a tube joint according to an embodiment of the present invention.

With reference to FIGS. 1 to 4, reference numeral 10 indicates a tube joint according to an embodiment of the present invention.

Figure 2:
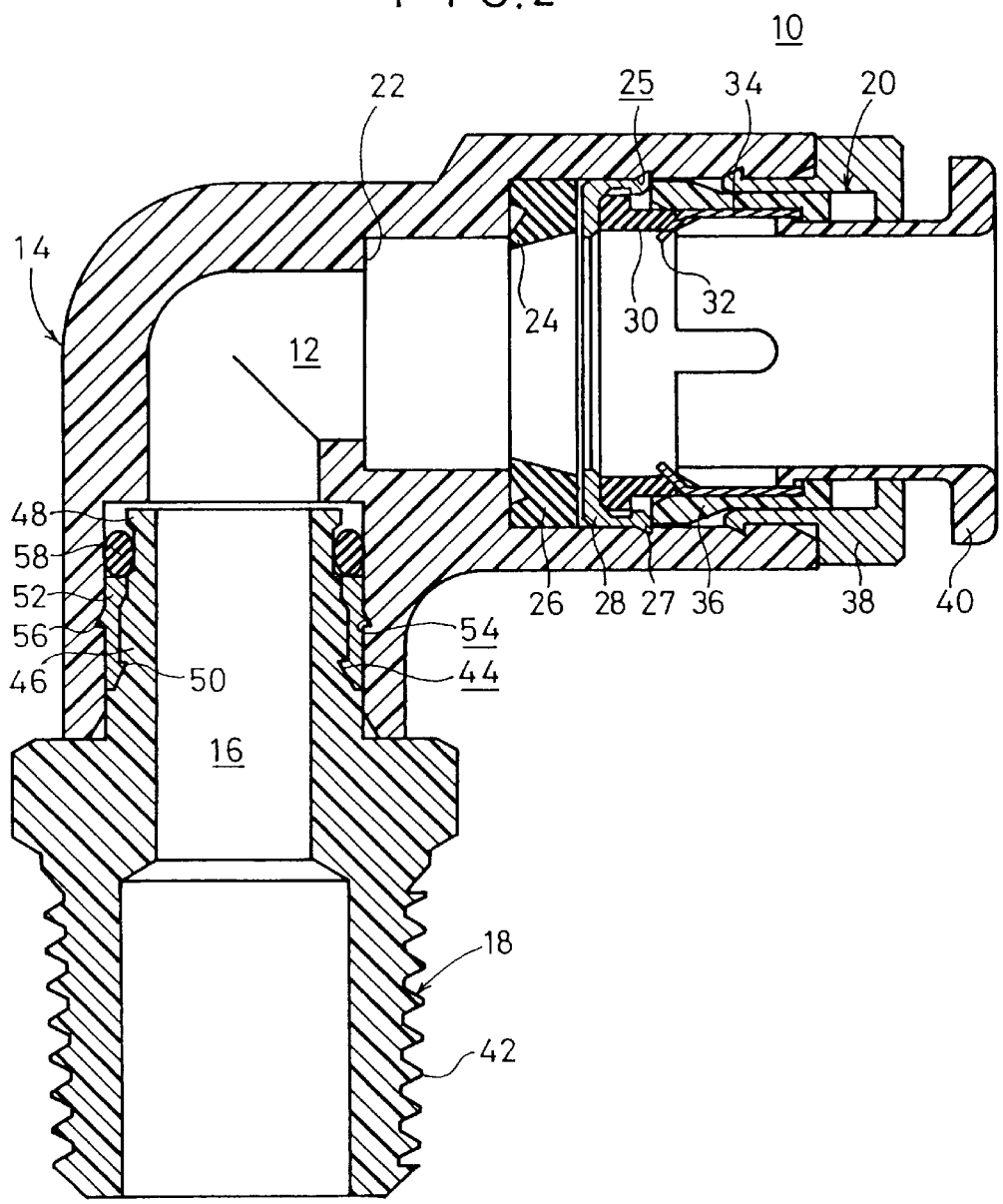
FIG. 2 shows a magnified longitudinal sectional view illustrating the tube joint shown in FIG. 1.

As shown in FIG. 2, the tube joint 10 is formed to be bent to have a substantially L-shaped configuration, and it comprises a joint body 14 which is provided with a first passage 12 penetrating through the inside, and a coupling member 18 which is installed to an opening disposed at a first end of the joint body 14 and which is formed with a second passage 16 communicating with the first passage 12. Each of the joint body 14 and the coupling member 18 is formed of a material made of synthetic resin.

A tube connection mechanism 20 is provided at an opening disposed at a second end of the joint body 14.

Figure 3:
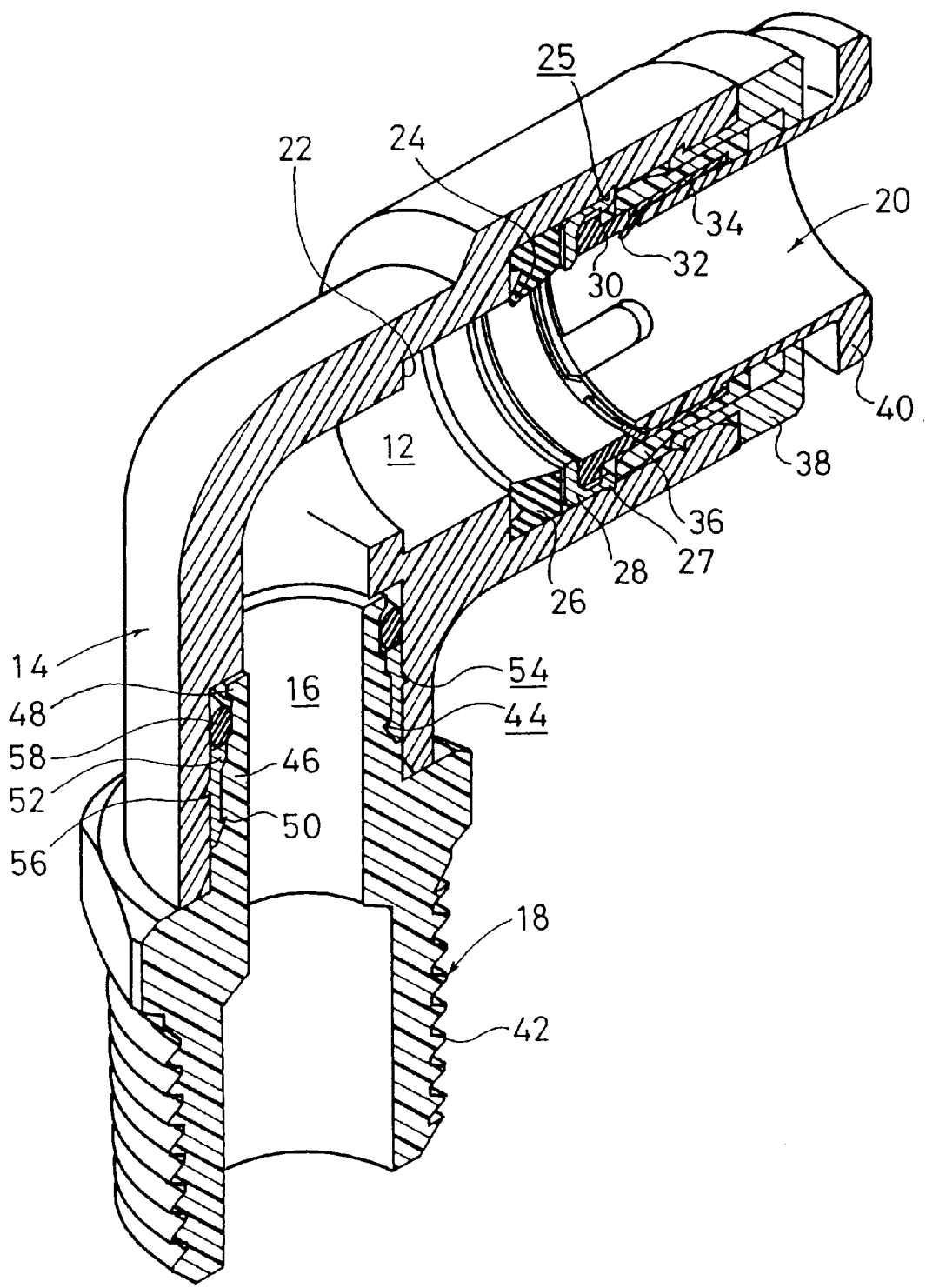
FIG. 3 shows a magnified perspective cut-out view of the tube joint shown in FIG. 1.
Figure 4:
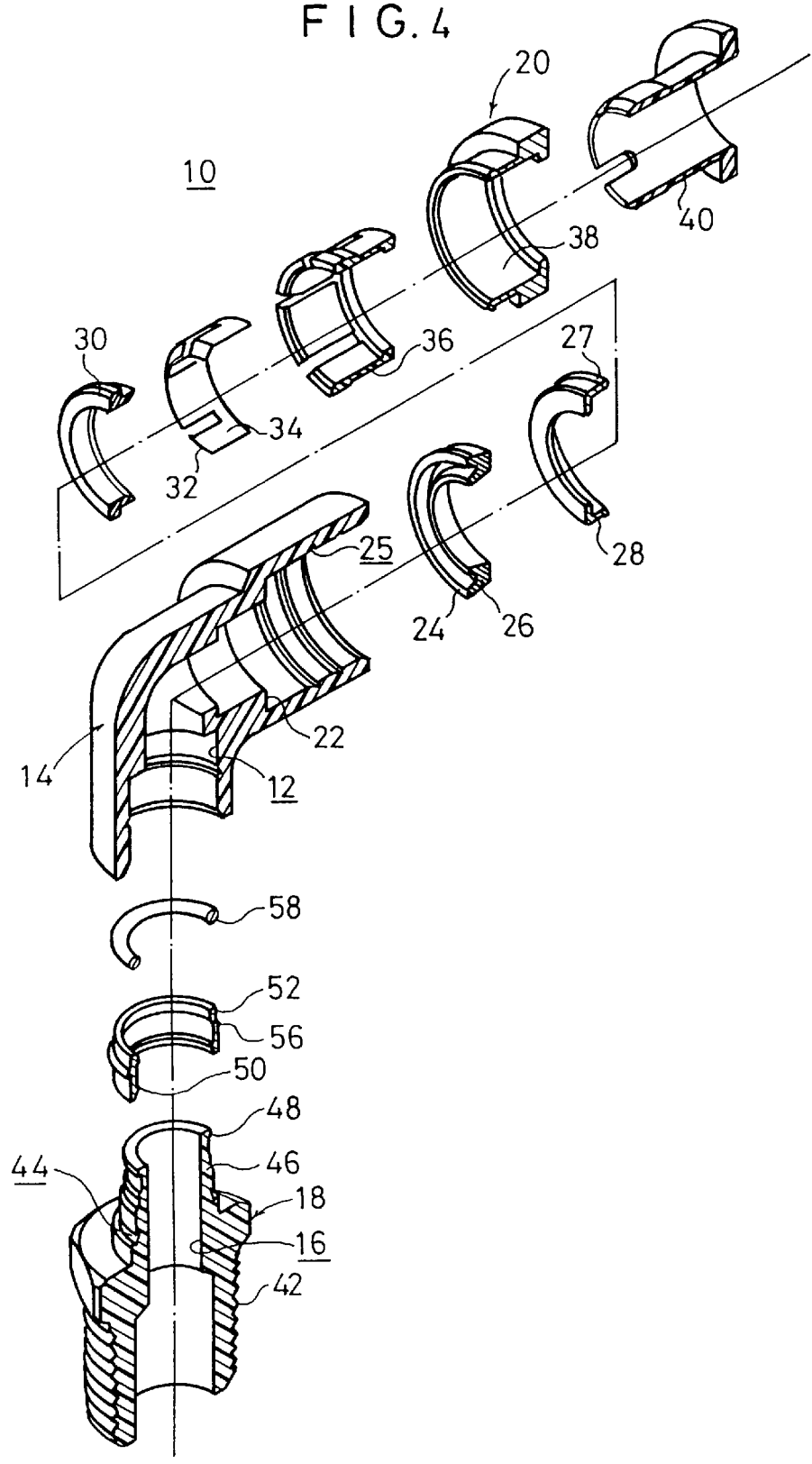
FIG. 4 shows an exploded perspective view in conformity with FIG. 3.
Figure 5:
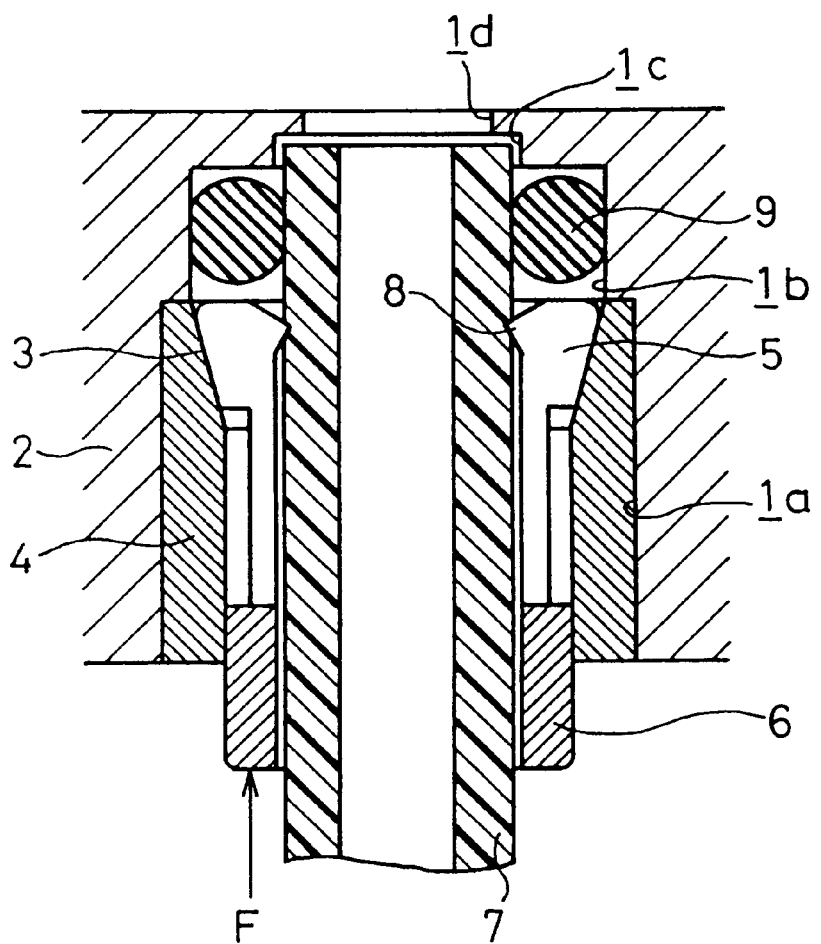
FIG. 5 shows a partial longitudinal sectional view illustrating a tube joint concerning the conventional technique.

As shown in FIGS. 2 to 4, the tube connection mechanism 20 includes an abutment surface 22 which is formed at the deepest portion of the opening of the joint body 14 and which abuts against a forward end of an unillustrated inserted tube so that the insertion portion of the tube is positioned.

As shown in FIGS. 2 to 4, the tube connection mechanism 20 has the following components in an order from the abutment surface 22 toward the side of the opening, i.e., a ring-shaped packing (seal member) 26 which is formed with a lip section 24 to make contact with the outer circumferential surface of the tube to be inserted and function as a seal, a ring-shaped stopper member 28 which is disposed in the vicinity of the packing 26 with a minute clearance intervening therebetween and which is formed with an annular projection 27 to be fitted to an annular groove 25 of the joint body 14, and a buffer member 30 which is installed to a bent inner wall surface of the stopper member 28.

In this arrangement, the buffer member 30 is disposed closely on the side of a chuck member 34 as described later on with the boundary of the stopper member 28. On the other hand, the seal member 26 is disposed closely on the side opposite to the buffer member 30 with the boundary of the stopper member 28. The minute clearance, which is formed between the packing 26 and the stopper member 28, function as relief which acts when the packing 26 is deformed.

Each of the packing 26 and the buffer member 30 is formed of, for example, an elastic material such as rubber. The stopper member 28 is formed of, for example, a material made of metal such as SUS 304 (as specified in JIS). In this arrangement, the stopper member 28 is fastened into the hole of the joint body 14 by the aid of the annular projection 27 fitted to the annular groove 25 of the joint body 14. Thus, the stopper member 28 functions such that the buffer member 30 is held thereby, and the packing 26 is prevented from sliding movement so that the generation of dust is avoided.

The tube connection mechanism 20 further comprises a chuck member 34 having a sharp pawl 32 formed at the forward end to bite into the outer circumferential surface of the tube so that the tube is locked and thus the tube is prevented from disengagement, a collet 36 for being externally fitted to the chuck member 34 to be held thereby, a guide member 38 installed to the opening of the joint body 14, and a release bush 40 for releasing the locked state of the chuck member 34 by making displacement along the guide member 38 in accordance with the guiding action of the guide member 38.

Each of the release bush 40 and the collet 36 is formed of, for example, a material made of resin. The guide member 38 is formed of, for example, a material made of metal such as SUS 304 (as specified in JIS).

In this arrangement, the buffer member 30 functions as a receiver for the chuck member 34. The buffer member 30 absorbs the load applied from the tube to the chuck member 34 when the tube is attached or detached. Thus, the buffer member 30 functions to improve the installation performance of the tube based on the oil-free specification.

The coupling member 18 includes a screw section 42 to be screwed into a pressure fluid inlet/outlet port of an unillustrated fluid pressure-operated apparatus, and a connecting section 46 having an annular first fastening groove 44 formed on the outer circumferential surface, for being fitted to the opening of the joint body 14. The connecting section 46 has a thick-walled section 48 which is formed to have a thick thickness in order to enhance the strength.

A cylindrical bush 52, which has its inner circumferential surface formed with a first annular projection 50 having a cross-sectional configuration corresponding to the first fastening groove 44 of the connecting section 46, is provided between the joint body 14 and the coupling member 18. A second annular projection 56, which is fastened to an annular second fastening groove 54 formed on the inner wall surface of the opening of the joint body 14, is formed on the outer circumferential surface of the bush 52.

In this arrangement, the first annular projection 50, which is formed on the inner wall surface of the bush 52, is fitted to the first fastening groove 44 of the coupling member 18. The second annular projection 56, which is formed on the outer wall surface of the bush 52, is fitted to the second fastening groove 54 of the joint body 14. Thus, the joint body 14 and the coupling member 18 are joined to one another in an integrated manner. The joint body 14 is provided rotatably in a predetermined direction about the center of rotation of the axis of the connecting section 46 in accordance with the sliding action on the coupling member 18 and the bush 52. Accordingly, the plumbing direction of the tube piping can be freely selected.

In other words, the joint body 14 and the coupling member 18 are not fitted to one another in a direct manner. They are fitted to one another by the aid of the bush 52 interposed therebetween. The bush 52 functions to prevent disengagement of the joint body 14 from the coupling member 18 to be fixed to the fluid pressure-operated apparatus.

An O-ring 58, which functions as a seal, is installed between the bush 52 and an annular step section formed at the deep portion of the opening of the joint body 14. Therefore, any chemical fluid is prevented by the O-ring 58 from penetration into the connected portion between the joint body 14 and the coupling member 18. The chemical fluid does not contact with the bush 52 which is formed of a material made of metal.

The tube joint 10 according to the embodiment of the present invention is basically constructed as described above. Next, its operation, function, and effect will be explained.

The coupling member 18 is screwed, with the screw section 42, into the fluid pressure inlet/outlet port of the unillustrated fluid pressure-operated apparatus such as a cylinder to fix the tube joint 10 to the fluid pressure-operated apparatus. Subsequently, the first end of the unillustrated tube is inserted along the hole of the release bush 40. During this process, the tube passes through the chuck member 34, the stopper member 28, and the packing 26, and it is inserted until the forward end of the tube abuts against the abutment surface 22. The outer circumferential surface of the inserted tube contacts with the lip section 24 of the packing 26, and thus the tube is sealed.

During this process, the tube, which has arrived at the abutment surface 22, is pulled slightly in the direction opposite to the insertion direction. Accordingly, the sharp pawl 32 of the chuck member 34 bites into the outer circumferential surface of the tube to give the locked state. Thus, the tube is prevented from disengagement.

When the tube is connected as described above, the pressure fluid, the chemical fluid or the like, which is supplied from the tube, is smoothly supplied to the fluid pressure-operated apparatus via the first passage 12 of the joint body 14 and the second passage 16 of the coupling member 18 which make communication with each other.

In the case of the tube joint 10 according to the embodiment of the present invention, when the tube is attached or detached, the packing 26 is prevented from sliding movement owing to the provision of the stopper member 28 for fixing and holding the packing 26. It is possible to avoid any generation of dust, which would be otherwise caused by any sliding movement of the packing 26. Therefore, the tube joint 10 according to the embodiment of the present invention can be preferably used in an environment such as a clean room which is required to possess cleanness.

In the case of the tube joint 10 according to the embodiment of the present invention, when the tube is attached or detached, the pressing force, which is applied to the pawl 32 of the chuck member 34, is preferably absorbed by the buffer member 30 held by the stopper member 28. Further, the packing 26 is protected by the stopper member 28 fastened in the hole of the joint body 14. Thus, the packing 26 is prevented from expansion in the radially inward direction. Therefore, when the tube is attached or detached, the packing 26 is not expanded and deformed, which would be otherwise caused by abutment of the chuck member 34 against the packing 26. As a result, in the case of the tube joint 10 according to the embodiment of the present invention, the tube can be easily attached or detached.

Further, in the case of the tube joint 10 according to the embodiment of the present invention, the sealing operation is effected by the packing 26 which surrounds the outer circumferential surface of the tube. Therefore, even when the stopper member 28 is formed of the strong material made of metal, the stopper member 28 is reliably prevented from contact with the pressure fluid, the chemical fluid or the like flowing through the first passage 12 of the joint body 14. Therefore, the quality of the chemical fluid or the like is not deteriorated by the stopper member 28.

As described above, in the case of the tube joint 10 according to the embodiment of the present invention, the generation of dust or the like is avoided, and the installation performance of the tube is improved. Therefore, the tube joint 10 according to the embodiment of the present invention can be conformed to the completely oil-free state. Accordingly, the tube joint 10 according to the embodiment of the present invention can be preferably used even in an environment such as a clean room in which cleanness is required.

What is claimed is:

1. A tube joint comprising:
   a joint body having a tube connection mechanism for attaching a detaching a tube and including a first passage formed at the inside to make communication with said tube; and
   a coupling member coupled integrally with said joint body and provided with a second passage communicating with said first passage,
   said tube connection mechanism further comprising:
   a chuck member for fastening said tube by the aid of a pawl that bites into said outer circumferential surface of said tube;
   a buffer member for absorbing a load applied to said chuck member when said tube is attached or detached;
   a seal member for functioning as a seal by surrounding an outer circumferential surface of said tube to be inserted, said seal member comprising an annular packing non-circular in cross-section and having a lip section projecting radially inwardly to make contact with said outer circumferential surface of said tube to effect sealing; and
   a stopper member disposed between said buffer member and said seal member for preventing sliding movement of said seal member by fixing said seal member, and wherein said buffer member is held by said stopper member, said stopper member having an annular configuration with a longitudinal cross-section being in a substantially L-shaped configuration.

2. The tube joint according to claim 1, wherein said tube connection mechanism further comprises a collet for being externally fitted to said chuck member to hold said chuck member, a guide member installed to an opening of said joint body, and a release bush for releasing a fastened state of said chuck member by making displacement along said guide member.

3. The tube joint according to claim 2, wherein said buffer member is disposed closely on a side of said chuck member with a boundary of said stopper member, while said seal member is disposed closely on a side opposite to said buffer member with a boundary of said stopper member.

4. The tube joint according to claim 1, wherein said stopper member is formed of a material made of metal, and a fluid flowing through said first and second passages is prevented from penetration into said stopper member by the aid of said seal member.

5. The tube joint according to claim 1, wherein a cylindrical bush is interposed between said joint body and said coupling member, and wherein a first annular projection for being fitted to a first fastening groove of said coupling member is formed on an inner circumferential surface of said bush, and a second annular projection for being fitted to a second fastening groove of said joint body is formed on an outer circumferential surface of said bush.

6. The tube joint according to claim 5, wherein said bush is formed of a material made of metal, and an O-ring for preventing said bush from inflow of fluid is provided between said joint body and said coupling member.

7. The tube joint according to claim 1, wherein said stopper member is formed with an annular projection, and wherein said annular projection is fitted to an annular groove of said joint body, and thus said stopper member is fastened to an inner wall surface of said joint body.

8. A tube joint comprising:
   a joint body having a tube connection mechanism for attaching and detaching a tube and including a first passage formed at the inside to make communication with said tube; and
   a coupling member coupled integrally with said joint body and provided with a second passage communicating with said first passage,
   wherein said tube connection mechanism is provided with a seal member for functioning as a seal by surrounding an outer circumferential surface of said tube to be inserted, and a stopper member for preventing sliding movement of said seal member by fixing said seal member,
   wherein a cylindrical bush is interposed between said joint body and said coupling member, and wherein a first annular projection for being fitted to a first fastening groove of said coupling member is formed on an inner circumferential surface of said bush, and a second annular projection for being fitted to a second fastening groove of said joint body is formed on an outer circumferential surface of said bush.

9. The tube joint according to claim 8, wherein said bush is formed of a material made of metal, and an O-ring for preventing said bush from inflow of fluid is provided between said joint body and said coupling member.

10. The tube joint according to claim 8, wherein said stopper member is formed with an annular projection, and wherein said annular projection is fitted to an annular groove of said joint body, and thus said stopper member is fastened to an inner wall surface of said joint body.

11. The tube joint according to claim 8, wherein said seal member is composed of a ring-shaped packing, and said packing is formed with a lip section to make contact with said outer circumferential surface of said tube to effect sealing.

12. The tube joint according to claim 8, wherein said stopper member is formed of a material made of metal, and a fluid flowing through said first and second passages is prevented from penetration into said stopper member by the aid of said seal member.

13. The tube joint according to claim 8, wherein said tube connection mechanism further comprises a chuck member for fastening said tube by the aid of a pawl to bite into said outer circumferential surface of said tube, a collet for being externally fitted to said chuck member to hold said chuck member, a guide member installed to an opening of said joint body, and a release bush for releasing a fastened state of said chuck member by making displacement along said guide member, and wherein said tube connection mechanism further comprises a buffer member for absorbing load applied to said chuck member when said tube is attached or detached.

14. The tube joint according to claim 13, wherein said buffer member is disposed closely on a side of said chuck member with a boundary of said stopper member, while said seal member is disposed closely on a side opposite to said buffer member with a boundary of said stopper member.

15. A tube joint comprising:

a joint body having a tube connection mechanism for attaching and detaching a tube and including a first passage formed at the inside to make communication with said tube; and a coupling member coupled integrally with said joint body and provided with a second passage communicating with said first passage, wherein said tube connection mechanism is provided with a seal member for functioning as a seal by surrounding an outer circumferential surface of said tube to be inserted, and a stopper member for preventing sliding movement of said seal member by fixing said seal member, wherein said stopper member is formed with an annular projection, and wherein said annular projection is fitted to an annular groove of said joint body, and thus said stopper member is fastened to an inner wall surface of said joint body.

16. The tube joint according to claim 15, wherein said seal member is composed of a ring-shaped packing, and said packing is formed with a lip section to make contact with said outer circumferential surface of said tube to effect sealing.

17. The tube joint according to claim 15, wherein said stopper member is formed of a material made of metal, and a fluid flowing through said first and second passages is prevented from penetration into said stopper member by the aid of said seal member.

18. The tube joint according to claim 15, wherein said tube connection mechanism further comprises a chuck member for fastening said tube by the aid of a pawl to bite into said outer circumferential surface of said tube, a collet for being externally fitted to said chuck member to hold said chuck member, a guide member installed to an opening of said joint body, and a release bush for releasing a fastened state of said chuck member by making displacement along said guide member, and wherein said tube connection mechanism further comprises a buffer member for absorbing load applied to said chuck member when said tube is attached or detached.

19. The tube joint according to claim 18, wherein said buffer member is disposed closely on a side of said chuck member with a boundary of said stopper member, while said seal member is dispose closely on a side opposite to said buffer member with a boundary of said stopper member.

* * * * *